(12) United States Patent
Yu

(10) Patent No.: US 11,738,753 B2
(45) Date of Patent: Aug. 29, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 17/209,270

(22) Filed: Mar. 23, 2021

(65) Prior Publication Data
US 2021/0300369 A1    Sep. 30, 2021

(30) Foreign Application Priority Data
Mar. 30, 2020    (JP) ................................. 2020-061420

(51) Int. Cl.
*B60W 30/18*     (2012.01)
*B60W 30/095*    (2012.01)
*G06V 20/58*     (2022.01)

(52) U.S. Cl.
CPC .... *B60W 30/18109* (2013.01); *B60W 30/095* (2013.01); *B60W 30/18163* (2013.01); *G06V 20/58* (2022.01); *B60W 2554/4045* (2020.02)

(58) Field of Classification Search
None
See application file for complete search history.

(56) References Cited

U.S. PATENT DOCUMENTS

2019/0009784 A1*  1/2019  Takeda ............ B60W 30/18154
2020/0391746 A1* 12/2020  Parks .............. B60W 60/00276

FOREIGN PATENT DOCUMENTS

JP            6446732        1/2019

* cited by examiner

*Primary Examiner* — Christian Chace
*Assistant Examiner* — Shayne M. Gilbertson
(74) *Attorney, Agent, or Firm* — Amin, Turocy & Watson, LLP

(57) ABSTRACT

A vehicle control device includes a controller configured to, when a plan is made to change a lane of the vehicle from a first lane to a second lane, cause the vehicle to change the lane to the second lane based on a position of a vehicle that travels in the second lane. When a first other vehicle which travels in the second lane and is a predetermined distance from the vehicle is recognized and a second other vehicle behind the vehicle in the second lane is not recognized, the controller sets a first virtual vehicle behind the first other vehicle and a second virtual vehicle behind the first virtual vehicle, and causes the vehicle to change the lane to the second lane based on a position of the first other vehicle, a position of the first virtual vehicle, and a position of the second virtual vehicle.

7 Claims, 14 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-061420, filed Mar. 30, 2020, the content of which is incorporated herein by reference.

BACKGROUND

Field

The present invention relates to a vehicle control device, a vehicle control method, and a storage medium.

Description of Related Art

In the related art, a vehicle control device is disclosed that, when nearby vehicles that fulfill a prescribed condition, such as a preceding vehicle not being recognizable, are not detected, controls a vehicle on the basis of a control plan generated by configuring virtual vehicles modeled virtually on the nearby vehicles (Japanese Patent No. 6446732).

However, the aforementioned device may not be able to set virtual vehicles at appropriate positions depending on a traffic environment. Therefore, the aforementioned device may not be able to cause the vehicle to smoothly change lanes.

SUMMARY

The present invention is achieved in view of the problems described above, and one object of the present invention is to provide a vehicle control device, a vehicle control method, and a storage medium, by which it is possible to cause a vehicle to smoothly change lanes.

A vehicle control device, a vehicle control method, and a storage medium according to the invention employ the following configurations.

(1) A vehicle control device includes a recognizer configured to recognize other vehicles near a vehicle; and a controller configured to, when a plan is made to change a lane of the vehicle from a first lane to a second lane, cause the vehicle to change the lane to the second lane based on a position of a vehicle that travels in the second lane recognized by the recognizer, wherein, when a first other vehicle which travels in the second lane and is a predetermined distance from the vehicle in a traveling direction is recognized and a second other vehicle behind the vehicle in the second lane is not recognized, the controller sets a first virtual vehicle behind the first other vehicle and a second virtual vehicle behind the first virtual vehicle, and causes the vehicle to change the lane to the second lane based on a position of the first other vehicle, a position of the first virtual vehicle, and a position of the second virtual vehicle.

(2) In the above aspect (1), the controller of the vehicle control device sets the first virtual vehicle at a position obtained based on the position of the first other vehicle, a speed of the first other vehicle, and a preset speed of the first virtual vehicle.

(3) In the above aspect (1) or (2), the controller sets the second virtual vehicle at a position obtained based on the position of the first other vehicle, the speed of the first other vehicle, and a preset speed of the second virtual vehicle.

(4) In the above aspect (3), the controller determines the speed of the first virtual vehicle and the speed of the second virtual vehicle based on information indicating a speed of the vehicle travelling in the second lane.

(5) In any one of the above aspects (1) to (4), the first lane is a merging path that merges into the second lane, an obstacle which hinders a vehicle traveling in the first lane from visually recognizing a situation of the second lane behind a merging point where the first lane merges into the second lane is provided in the vicinity of a start point of the merging point, and when a plan is made to merge the lane of the vehicle from the first lane to the second lane, the controller causes the vehicle to change the lane to the second lane.

(6) In any one of the above aspects (1) to (5), when the vehicle is travelling in the first lane and the second other vehicle is recognized behind the first other vehicle in the second lane, the controller cancels the setting of the first virtual vehicle, and causes the vehicle to change the lane based on the second other vehicle, and a third other vehicle newly set behind the second other vehicle or a third other vehicle behind the second other vehicle.

(7) In any one of the above aspects (1) to (6), when the second other vehicle is recognized behind the first other vehicle in the second lane and a speed of the recognized second other vehicle is faster than a preset speed of the second virtual vehicle, the controller regards the second other vehicle as the first other vehicle.

(8) In any one of the above aspects (1) to (7), when the second other vehicle is recognized behind the first other vehicle in the second lane and the recognized second other vehicle is located behind the second virtual vehicle, the controller causes the vehicle to change the lane based on the first virtual vehicle and the second other vehicle.

(9) A vehicle control method according to an aspect of the invention is implemented by a computer that performs: a process of recognizing other vehicles near a vehicle; a process of, when a plan is made to change a lane of the vehicle from a first lane to a second lane, causing the vehicle to change the lane to the second lane based on a position of a vehicle that travels in the recognized second lane; and a process of, when a first other vehicle which travels in the second lane and is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane based on a position of the first other vehicle, a position of the first virtual vehicle, and a position of the second virtual vehicle.

(10) A storage medium storing a program according to an aspect of the invention causes a computer to perform: a process of recognizing other vehicles near a vehicle; a process of, when a plan is made to change a lane of the vehicle from a first lane to a second lane, causing the vehicle to change the lane to the second lane based on a position of a vehicle that travels in the recognized second lane; and a process of, when a first other vehicle which travels in the second lane and is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane based on a position of the first other vehicle, a position of the first virtual vehicle, and a position of the second virtual vehicle.

According to (1) to (10), the vehicle control device causes the vehicle to change lanes to the second lane based on the position of the first other vehicle, the position of the first virtual vehicle, and the position of the second virtual vehicle, thereby causing the vehicle to smoothly change lanes.

According to (4), the vehicle control device determines the speed of the first virtual vehicle and the speed of the second virtual vehicle based on the information indicating the speed of the vehicle travelling in the second lane, thereby setting virtual vehicles assuming a more realistic speed.

According to (6) to (8), when the second other vehicle that has not been recognizable is recognized, the vehicle control device can set a reference vehicle according to the position or speed of the recognized other vehicle and cause the vehicle to change lanes based on the set vehicle, thereby implementing a lane change flexibly in response to changes in the situation.

DESCRIPTION OF EMBODIMENTS

Hereinafter, an embodiment of a vehicle control device, a vehicle control method, and a storage medium of the present invention will be described with reference to the drawings.

[Overall Configuration]

Figure 1:
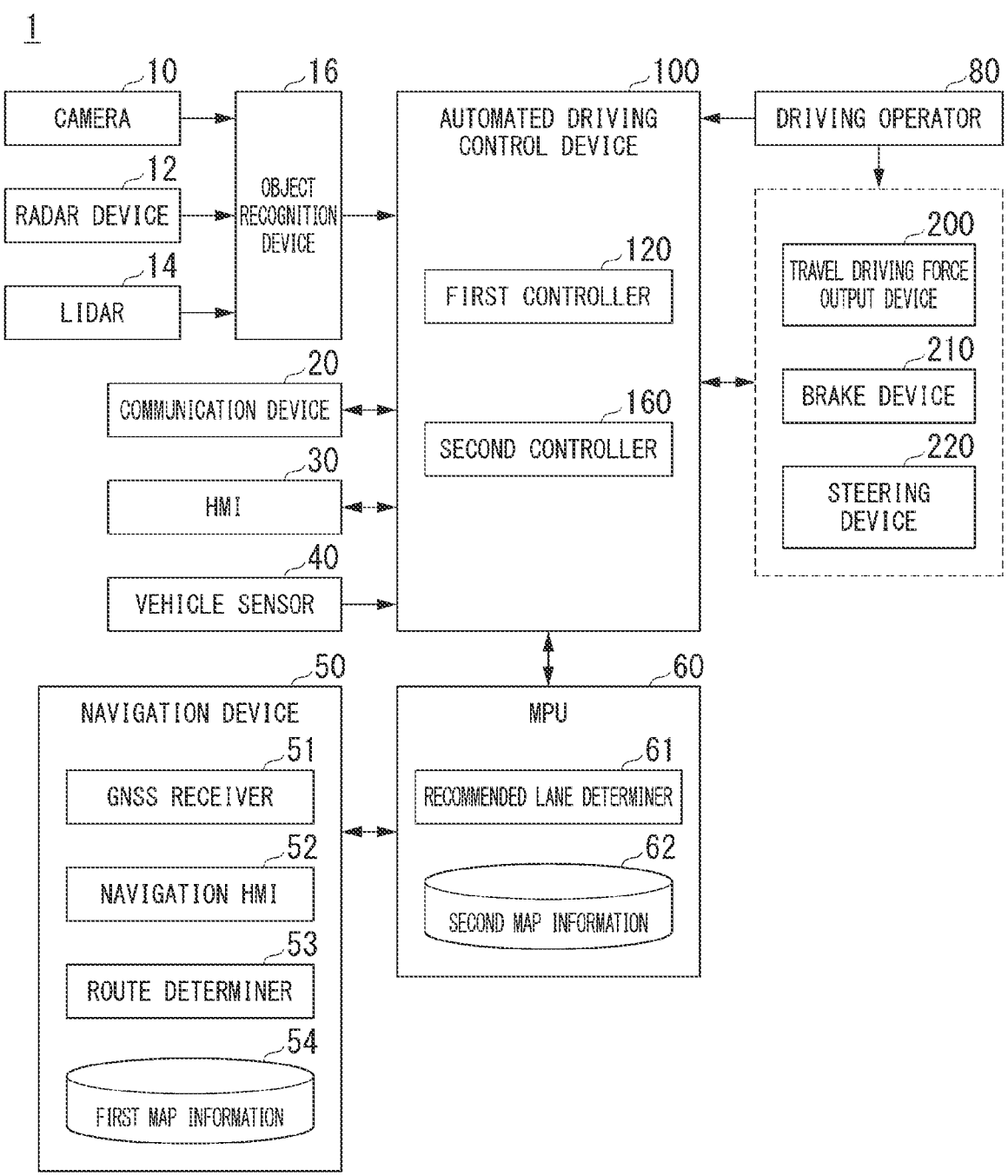
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is installed is a vehicle with two wheels, three wheels, four wheels, and the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map-positioning unit (MPU) 60, a driving operator 80, an automated driving control device 100, a travel driving force output device 200, a brake device 210, and a steering device 220. These devices and equipment are connected to one another via a multiplex communication line such as a controller area network (CAN) communication line, a serial communication line, a wireless communication network, and the like. The configuration shown in FIG. 1 is merely an example, and a part of the configuration may be omitted or other configurations may be added.

The camera 10 is, for example, a digital camera using a solid-state imaging element such as a charge-coupled device (CCD) and a complementary metal-oxide-semiconductor (CMOS). The camera 10 is mounted at arbitrary places on the vehicle (hereinafter, referred to as a host vehicle M) in which the vehicle system 1 is installed. In the case of capturing an image of an area in front of the host vehicle M, the camera 10 is mounted on an upper part of a front windshield, on a rear surface of a rear-view mirror, and the like. The camera 10, for example, periodically and repeatedly captures the surroundings of the host vehicle M. The camera 10 may be a stereo camera.

The radar device 12 emits radio waves such as millimeter waves to the surroundings of the host vehicle M, detects radio waves (reflected waves) reflected by an object, and detects at least a position (a distance and an orientation) of the object. The radar device 12 is mounted at arbitrary places on the host vehicle M. The radar device 12 may detect the position and the speed of the object by a frequency-modulated continuous wave (FM-CW) scheme.

The LIDAR 14 emits light (or electromagnetic waves having a wavelength close to that of light) to the surroundings of the host vehicle M and measures scattered light. The LIDAR 14 detects a distance to a target on the basis of a time from light emission to light reception. The emitted light is a pulsed laser beam, for example. The LIDAR 14 is mounted at arbitrary places on the host vehicle M.

The object recognition device 16 performs a sensor fusion process on results of detection by some or all of the camera 10, the radar device 12, and the LIDAR 14, thereby recognizing the position, the type, the speed and the like of an object. The object recognition device 16 outputs a recognition result to the automated driving control device 100. The object recognition device 16 may output the detection results of the camera 10, the radar device 12, and the LIDAR 14 to the automated driving control device 100 as are. The object recognition device 16 may be omitted from the vehicle system 1.

The communication device 20 communicates with other vehicles present around the host vehicle M, or communicates with various server devices via a wireless base station by using, for example, a cellular network, a Wi-Fi network, Bluetooth (registered trademark), dedicated short-range communication (DSRC) and the like.

The HMI 30 presents various types of information to an occupant of the host vehicle M and receives an input operation of the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects acceleration, a yaw rate sensor that detects an angular velocity around the vertical axis, a direction sensor that detects the orientation of the host vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) and a flash memory. The GNSS receiver 51 specifies the position of the host vehicle M on the basis of a signal received from a GNSS satellite. The position of the host vehicle M may be specified or complemented by an inertial navigation system (INS) using the output of the vehicle sensor 40. The navigation HMI 52 includes a display device, a speaker, a touch panel, keys, and the like. The navigation HMI 52 may be partially or entirely shared with the aforementioned HMI 30. The route determiner 53 determines, for example, a route (hereinafter, referred to as a route on a map) to a destination, which is input by an occupant using the navigation HMI 52, from the position of the host vehicle M specified by the GNSS receiver 51 (or any input position) with reference to the first map information 54. The first map information 54 is, for example, information in which a road shape is expressed by links indicating a road and nodes connected by the links. The first map information 54 may include a road curvature, point of interest (POI) information, and the like. The route on the map is output to the MPU 60. The navigation device 50 may provide route guidance using the navigation HMI 52 on the basis of the route on the map. The navigation device 50 may be implemented by, for example, functions of a terminal device such as a smart phone and a tablet terminal owned by an occupant. The navigation device 50 may transmit the current position and the destination to a navigation server via the communication device 20, and acquire a route equivalent to the route on the map from the navigation server.

The MPU 60 includes, for example, a recommended lane determiner 61 and stores second map information 62 in a storage device such as an HDD and a flash memory. The recommended lane determiner 61 divides the route on the map provided from the navigation device 50 into a plurality of blocks (for example, divides the route on the map every 100 m in the vehicle travel direction), and determines a recommended lane for each block with reference to the second map information 62. The recommended lane determiner 61 determines which lane to travel from the left. When there is a branch point on the route on the map, the recommended lane determiner 61 determines a recommended lane such that the host vehicle M can travel on a reasonable route for traveling to a branch destination.

The second map information 62 is more accurate map information than the first map information 54. The second map information 62 includes, for example, information on the center of a lane, information on the boundary of the lane, and the like. The second map information 62 may include road information, traffic regulation information, address information (address and postal code), facility information, telephone number information, and the like. The second map information 62 may be updated at any time by the communication device 20 communicating with another device.

The driving operator 80 includes, for example, an accelerator pedal, a brake pedal, a shift lever, steering wheel, a deformed steer, a joy stick, and other operators. The driving operator 80 is provided with a sensor for detecting an operation amount or the presence or absence of an operation, and its detection result is output to the automated driving control device 100, or some or all of the travel driving force output device 200, the brake device 210, and the steering device 220.

The automated driving control device 100 includes, for example, a first controller 120 and a second controller 160. Each of the first controller 120 and the second controller 160 is implemented by, for example, a hardware processor such as a central processing unit (CPU) executing a program (software). Some or all of these components may be implemented by hardware (a circuit unit: including circuitry) such as a large-scale integration (LSI), an application-specific integrated circuit (ASIC), a field-programmable gate array (FPGA), and a graphics-processing unit (GPU), or may be implemented by software and hardware in cooperation. The program may be stored in advance in a storage device (storage device including a non-transitory storage medium) such as an HDD and a flash memory of the automated driving control device 100, or may be installed in the HDD and the flash memory of the automated driving control device 100 when a detachable storage medium (non-transitory storage medium) storing the program, such as a DVD and a CD-ROM, is mounted on a drive device. The automated driving control device 100 is an example of a "vehicle control device".

Figure 2:
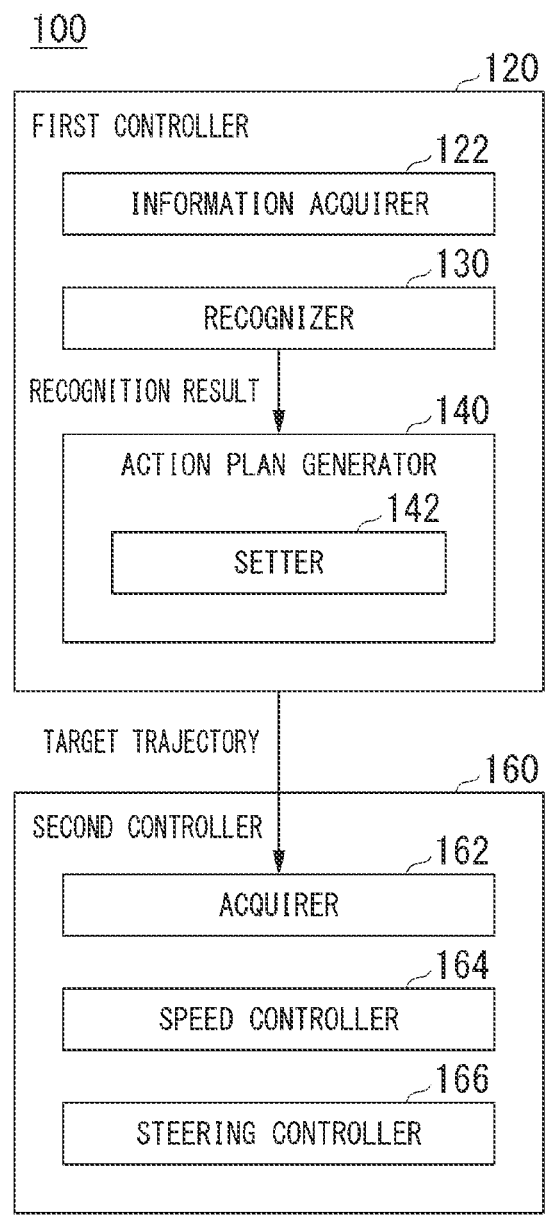
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 performs, for example, a function based on artificial intelligence (AI) and a function based on a predetermined model in parallel. For example, a function of "recognizing an intersection" may be implemented by performing intersection recognition by deep learning and the like and recognition based on a predetermined condition (pattern-matching signals, road markings, and the like) in parallel, or scoring both recognition and comprehensively evaluating them. In this way, the reliability of automated driving is ensured.

The recognizer 130 recognizes a state such as the position, speed, acceleration and the like of an object around the host vehicle M on the basis of information input from the camera 10, the radar device 12, and the LIDAR 14 via the object recognition device 16. The position of the object is recognized as, for example, a position on absolute coordinates with a representative point (center of gravity, the center of the drive axis, and the like) of the host vehicle M as the origin, and is used for control. The position of the object may be represented by a representative point of the center of gravity, a corner, and the like of the object, or may be represented by an indicated area. The "state" of the object may include an acceleration, a jerk, or an "action state" (for example, whether a lane change is being performed or is intended to be performed) of the object.

The recognizer 130 recognizes, for example, a lane (a travel lane) in which the host vehicle M is traveling. For example, the recognizer 130 compares a pattern (for example, an arrangement of solid lines and broken lines) of road division lines obtained from the second map information 62 with a pattern of road division lines around the host vehicle M, which is recognized from the image captured by the camera 10, thereby recognizing the travel lane. The recognizer 130 may recognize the travel lane by recognizing not only the road division lines but also a traveling road boundary (road boundary) including the road division lines, a road shoulder, a curb, a median strip, a guardrail, and the like. In this recognition, the position of the host vehicle M acquired from the navigation device 50 or a processing result of the INS may be taken into consideration. The recognizer 130 recognizes a temporary stop line, an obstacle, a red light, a tollgate, and other road events.

When recognizing the travel lane, the recognizer 130 recognizes the position and the orientation of the host vehicle M with respect to the travel lane. The recognizer 130, for example, may recognize, as the relative position and the orientation of the host vehicle M with respect to the travel lane, a deviation of a reference point of the host vehicle M from a center of a lane and an angle formed with respect to a line connecting the center of the lane in the traveling direction of the host vehicle M. Instead of this, the recognizer 130 may recognize the position and the like of the reference point of the host vehicle M with respect to any one of the side ends (the road division line or the road boundary) of the travel lane as the relative position of the host vehicle M with respect to the travel lane.

The action plan generator 140 generates a target trajectory along which the host vehicle M will travel in the future automatically (independent of a driver's operation) to be able to travel in the recommended lane determined by the recommended lane determiner 61 in principle and further to cope with surrounding situations of the host vehicle M. The target trajectory includes, for example, a speed element. For example, the target trajectory is represented as a sequence of points (trajectory points) to be reached by the host vehicle M. The trajectory point is a point that the host vehicle M is to reach every predetermined travel distance (for example, about several meters) along a road, and a target speed and a target acceleration at every predetermined sampling time (for example, about several tenths of a [sec]) are separately generated as a part of the target trajectory. Furthermore, the trajectory point may be a position that the host vehicle M is to reach at the sampling time for each predetermined sampling time. In such a case, information on the target speed and the target acceleration is represented by the interval between the trajectory points.

When generating the target trajectory, the action plan generator 140 may set events for automated driving. The events for automated driving include constant speed travel events, low speed travel events, lane change events, branch events, merge events, takeover events, and the like. The action plan generator 140 generates the target trajectory according to an activated event.

The action plan generator 140 includes, for example, a setter 142. The setter 142 sets a virtual vehicle, which virtually models another vehicle, on a road. The action plan generator 140 generates an action plan on the basis of the virtual vehicle. Details of this process will be described below.

The second controller 160 controls the travel driving force output device 200, the brake device 210, and the steering device 220 such that the host vehicle M passes through the target trajectory generated by the action plan generator 140 at scheduled times.

The second controller 160 includes, for example, an acquirer 162, a speed controller 164, and a steering controller 166. The acquirer 162 acquires information on the target trajectory (trajectory points) generated by the action plan generator 140 and stores the information in a memory (not shown). The speed controller 164 controls the travel driving force output device 200 or the brake device 210 on the basis of a speed element associated with the target trajectory stored in the memory. The steering controller 166 controls the steering device 220 according to the degree of bending of the target trajectory stored in the memory. The processes of the speed controller 164 and the steering controller 166 are implemented by, for example, a combination of feedforward control and feedback control. As an example, the steering controller 166 performs a combination of feedforward control according to the curvature of a road in front of the host vehicle M and feedback control based on a deviation from the target trajectory.

The travel driving force output device 200 outputs a travel driving force (torque) for driving the vehicle to driving wheels. The travel driving force output device 200 includes, for example, a combination of an internal combustion engine, an electric motor, a transmission and the like, and an electronic controller (ECU) for controlling them. The ECU controls the aforementioned configuration according to information input from the second controller 160 or information input from the driving operator 80.

The brake device 210 includes, for example, a brake caliper, a cylinder for transferring hydraulic pressure to the brake caliper, an electric motor for generating the hydraulic pressure in the cylinder, and a brake ECU. The brake ECU controls the electric motor according to the information input from the second controller 160 or the information input from the driving operator 80, thereby allowing a brake torque corresponding to a brake operation to be output to each wheel. The brake device 210 may have a backup mechanism for transferring the hydraulic pressure generated by an operation of the brake pedal included in the driving operator 80 to the cylinder via a master cylinder. The brake device 210 is not limited to the aforementioned configuration and may be an electronically controlled hydraulic pressure brake device that controls an actuator according to the information input from the second controller 160, thereby transferring the hydraulic pressure of the master cylinder to the cylinder.

The steering device 220 includes, for example, a steering ECU and an electric motor. The electric motor, for example, changes an orientation of a steering wheel by allowing a force to act on a rack and pinion mechanism. The steering ECU drives the electric motor according to the information input from the second controller 160 or the information input from the driving operator 80, thereby changing the orientation of the steering wheel.

[Process (Premise) Related to Lane Change]

Figure 3:
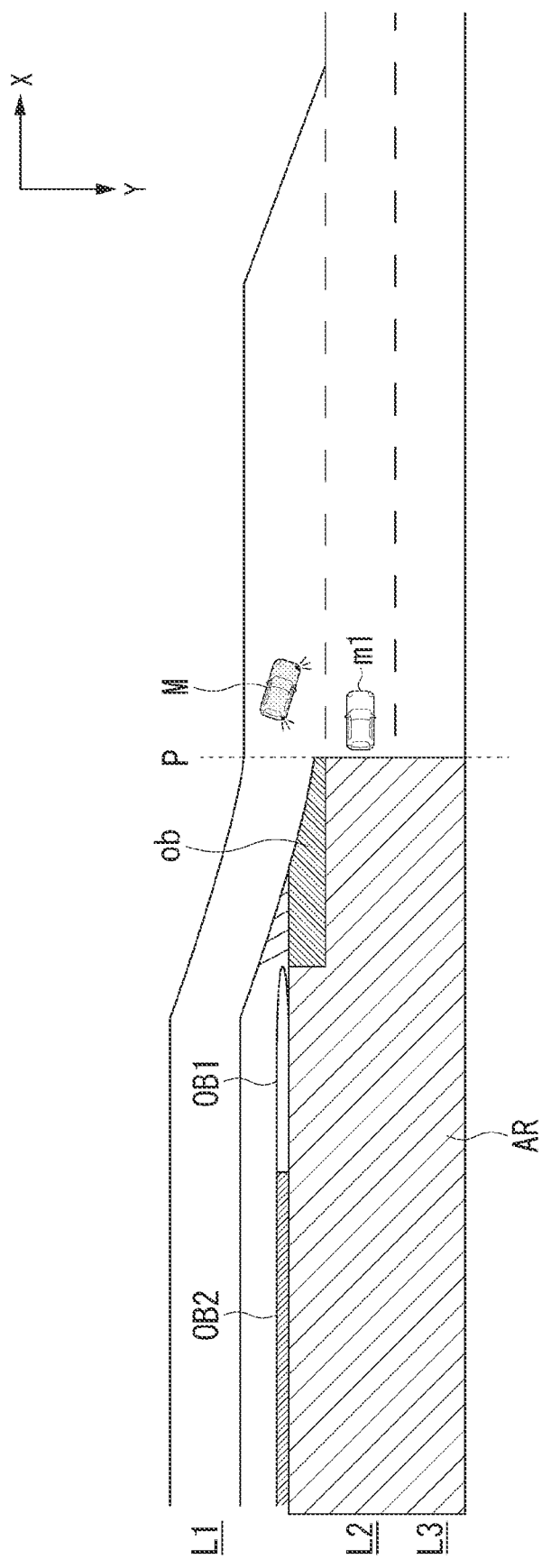
FIG. 3 is a diagram explaining a process in which a host vehicle changes lanes.

FIG. 3 is a diagram explaining a process in which the host vehicle M changes lanes. In the following description, a vehicle traveling direction (road extension direction) may be referred to as an X direction and a vehicle width direction (road width direction) may be referred to as a Y direction.

The road shown in FIG. 3 includes a first lane L1, a second lane L2, and a third lane L3. The first lane L1 is a lane that merges into the second lane L2. The first lane L1 merges into the second lane L2 and then disappears at a predetermined distance. In front of a merging point P where the first lane L1 merges into the second lane L2, a division body OB1 and a division body OB2 that divide the first lane L1 and the second lane L2 are provided in that order from the plus X direction side.

An object ob having a predetermined height is provided between the merging point P and the division body OB1. The object ob is an example of an obstacle that is provided in the vicinity of the start point of the merging point P where the first lane L1 merges into the second lane L2. The object ob hinders that a vehicle traveling in the first lane L1 visually recognizes the situation of the second lane L2 behind the merging point P (the object ob hinders a vehicle traveling in the first lane from visually recognizing a situation of the second lane behind a merging point). This obstacle may be a fixed object such as a wall or an object that is present temporarily such as a vehicle.

A vehicle M travels in the first lane L1 and is located in front of the merging point P. Another vehicle m1 which travels in the second lane L2 is located ahead of the merging point P and on the lateral side of the vehicle M. The recognizer 130 of the vehicle M is not able to recognize the situation of the third lane L3 and the second lane L2 (situation of an area AR) behind the merging point P because of the object ob.

Figure 4:
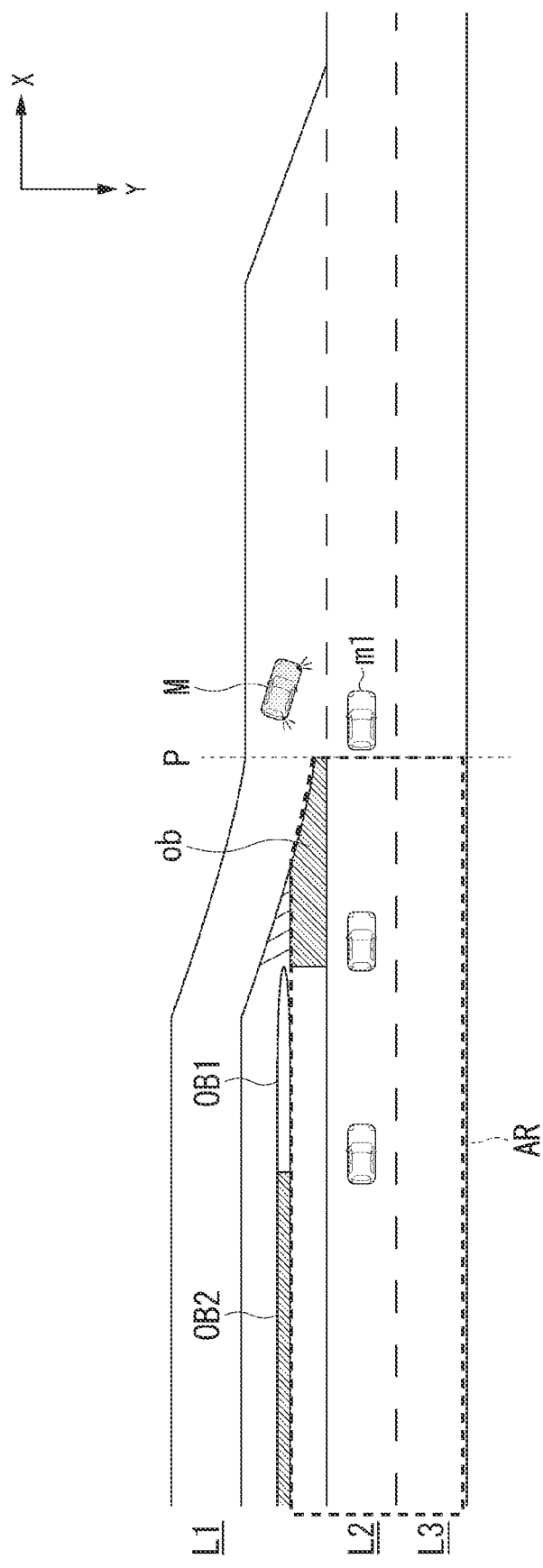
FIG. 4 is a diagram showing an example of the situations of a second lane and a third lane.

As described above, when the recognizer 130 is not able to recognize the situation of the area AR, the vehicle M may not be able to smoothly change lanes. This is because, when there are vehicles behind the other vehicle m1 as shown in FIG. 4, the vehicle M needs to adjust its own speed according to the speeds of the vehicles traveling in the second lane L2 and to smoothly change lanes to the rear and the like of the vehicles traveling in the second lane L2. However, when the rear vehicles are not recognizable, the vehicle M may not be able to control itself at an appropriate speed when changing lanes. FIG. 4 is a diagram showing an example of the situations of the second lane L2 and the third lane L3. Drawings subsequent to FIG. 4 show the situation of the area AR, but it is assumed that the vehicle M is not able to recognize the situation of the area AR.

[Process (Overview) Related to Lane Change]

When a first other vehicle which travels in the second lane L2 to which the first lane L1 is connected and is at a predetermined distance from the vehicle M in the traveling direction is recognized and a second other vehicle behind the vehicle M in the second lane L2 is not recognized, the action plan generator 140 sets a first virtual vehicle behind the first other vehicle and a second virtual vehicle behind the first virtual vehicle, and causes the vehicle M to change lanes to the second lane L2 on the basis of a position of the first other vehicle, a position of the first virtual vehicle, and a position of the second virtual vehicle.

The first other vehicle may be, for example, a vehicle located behind the vehicle M or next to the vehicle M with respect to the traveling direction. "Causing the vehicle M to change lanes to the second lane L2 on the basis of the position of the first other vehicle, the position of the first virtual vehicle, and the position of the second virtual vehicle" also includes the automated driving control device 100 setting the first virtual vehicle and the second virtual vehicle when the vehicle M changes lanes, controlling the vehicle M for a predetermined time on the basis of the set positions, and then causing the vehicle M to change lanes on the basis of another actually recognized vehicle. Details of this process will be described below.

Figure 5:
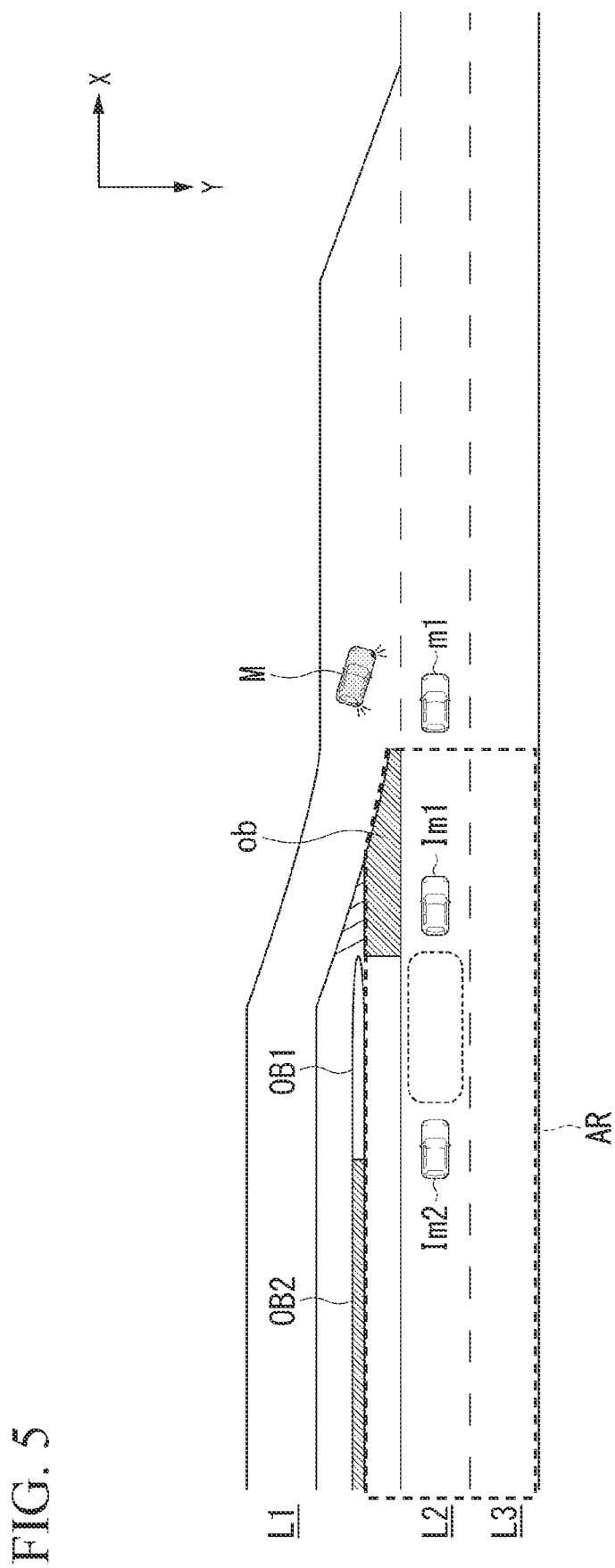
FIG. 5 is a diagram explaining the setting of virtual vehicles.

FIG. 5 is a diagram explaining the setting of virtual vehicles. In order to cause the vehicle M to smoothly change lanes, the automated driving control device 100 sets a first virtual vehicle Im1 behind the other vehicle m1 and a second virtual vehicle Im2 behind the first virtual vehicle Im1.

Figure 6:
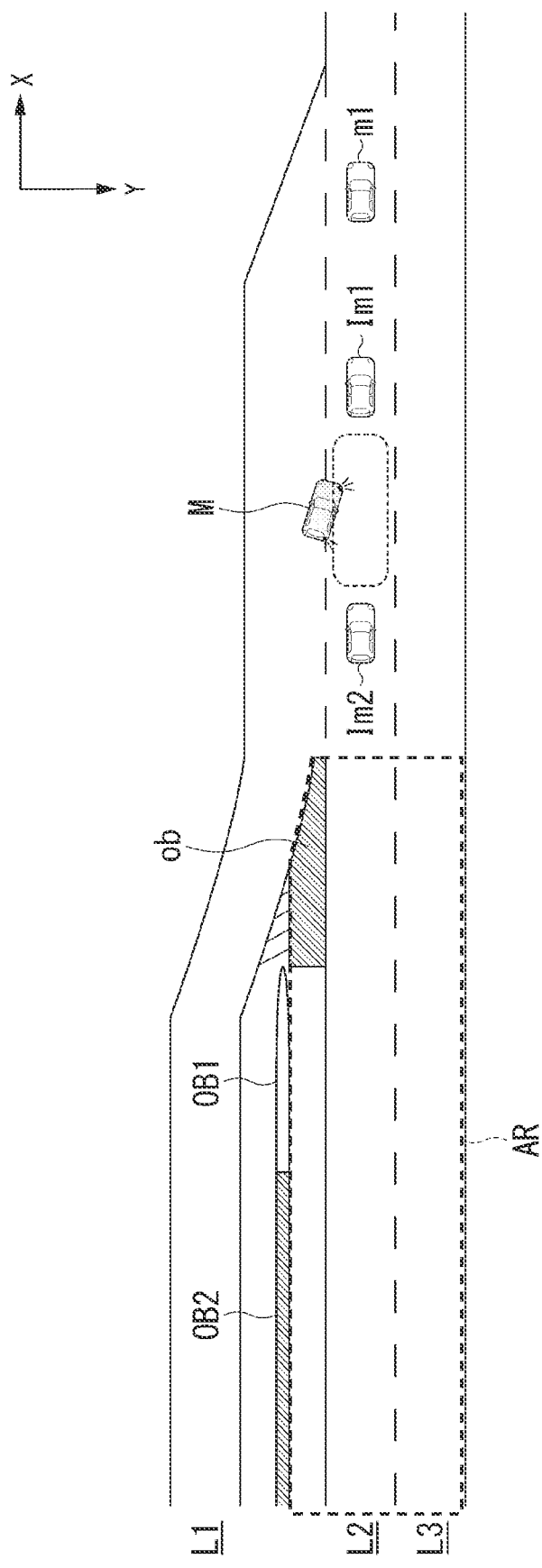
FIG. 6 is a diagram showing an example of a situation in which a vehicle M changes lanes between a first virtual vehicle and a second virtual vehicle.

The automated driving control device 100 generates an action plan to perform a lane change between the first virtual vehicle Im1 and the second virtual vehicle Im2 Then, the automated driving control device 100 controls the speed and steering of the vehicle M to cause the vehicle M to change lanes to the second lane L2 on the basis of the action plan. FIG. 6 is a diagram showing an example of a situation in which the vehicle M changes lanes between the first virtual vehicle Im1 and the second virtual vehicle Im2

[Virtual Vehicle-Setting Method (Process of Determining Speed)]

The setter 142 determines a speed of the first virtual vehicle and a speed of the second virtual vehicle on the basis of information indicating a speed of a vehicle travelling in the second lane L2. The setter 142 acquires the speed of the virtual vehicle (the first virtual vehicle Im1 or the second virtual vehicle Im2) on the basis of traffic information and sets the speed of the virtual vehicle on the basis of the acquired traffic information.

The traffic information is information on a speed of another vehicle that has been travelling in the second lane L2 (or the third lane L3). The traffic information is information acquired by an information acquirer 122. The information acquirer 122 acquires traffic information provided by a traffic information server (not shown). The traffic information may be information obtained on the basis of a speed of another vehicle recognized while the vehicle M is travelling.

Figure 7:
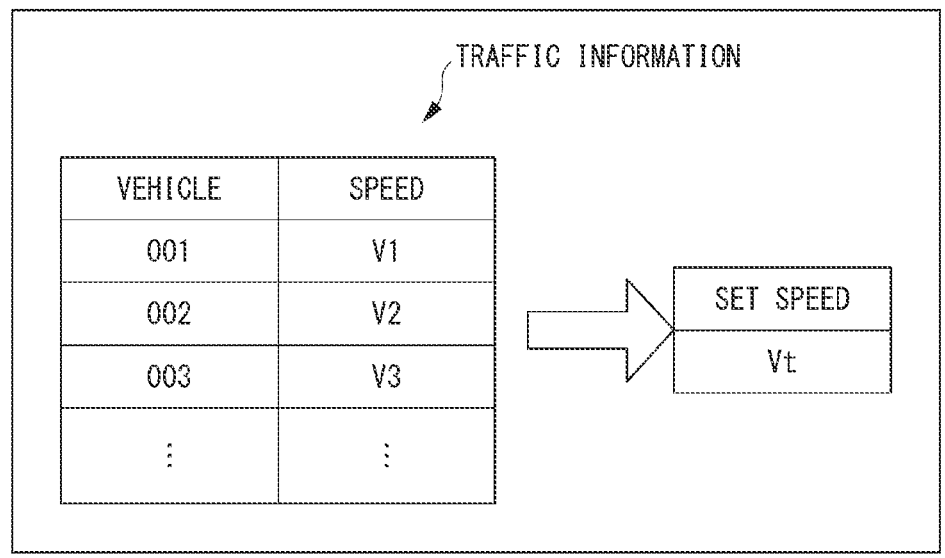
FIG. 7 is a diagram explaining a set speed.

For example, as shown in FIG. 7, the setter 142 extracts the fastest speed from traffic information and sets the extracted speed as a set speed to be set in a virtual vehicle. Instead of the fastest speed, the setter 142 may set, as the set speed, for example, the fastest speed among speeds not exceeding an upper limit speed, or the fastest speed among speeds having a predetermined appearance probability or higher in a normal distribution of speeds in which the other vehicles traveled the first lane or the second lane.

[Virtual Vehicle-Setting Method (Process of Determining Position)]

The setter 142 sets the first virtual vehicle at a position obtained on the basis of the position of the first other vehicle, a speed of the first other vehicle, and a preset speed (set speed) of the first virtual vehicle. The setter 142 sets the second virtual vehicle at a position obtained on the basis of the position of the first other vehicle, the speed of the first other vehicle, and a preset speed (set speed) of the second virtual vehicle.

Figure 8:
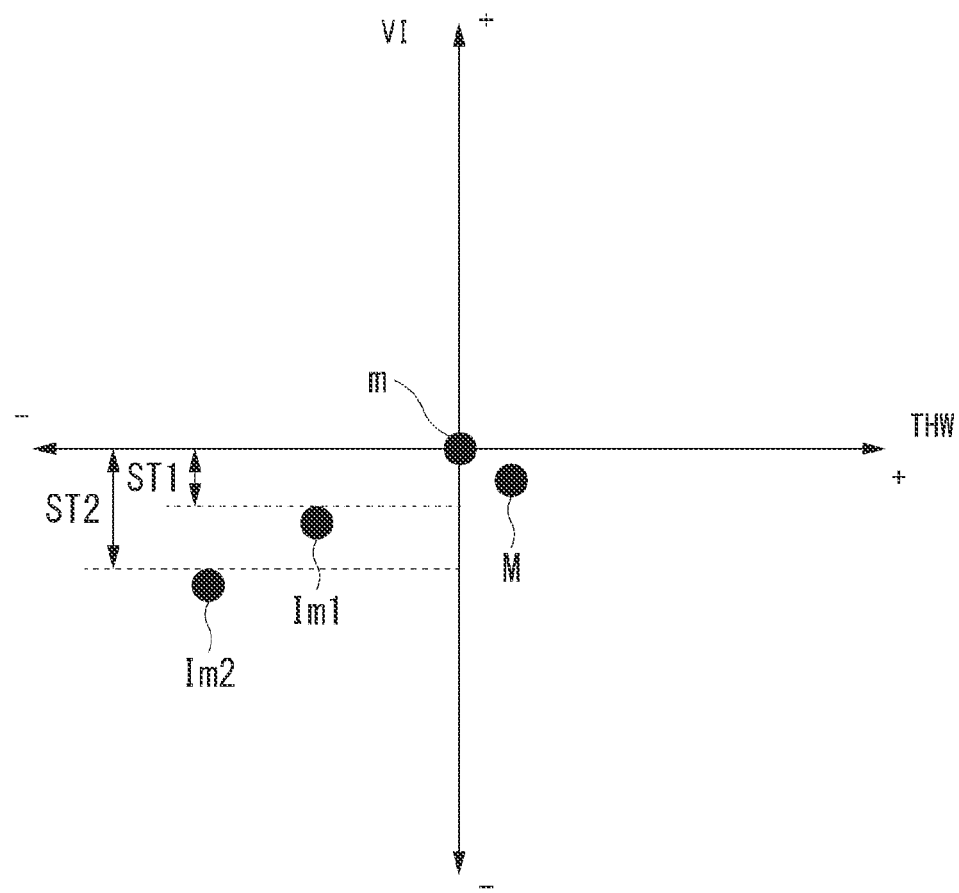
FIG. 8 is a graph explaining a process of setting the positions of virtual vehicles.

The setter 142 determines the positions of virtual vehicles by using a speed index to be described below. FIG. 8 is a graph explaining a process of setting the positions of virtual vehicles. In the graph, the vertical axis denotes VI (speed index) and the horizontal axis denotes THW (time headway). The present graph is a graph based on another vehicle m.

In the graph, the position of the vehicle M with respect to the other vehicle m is calculated by the following formulas (1) and (2). X (M) denotes a position of the vehicle M in the traveling direction and X (m) denotes a position of the other vehicle m in the traveling direction. V (M) denotes the speed of the vehicle M and V (m) denotes the speed of the other vehicle m.

$$THW=(X(M)-X(m))/V(m) \quad (1)$$

$$VI=(X(M)-X(m))/(V(M)-V(m)) \quad (2)$$

In the graph, the position of the first virtual vehicle Im1 with respect to the other vehicle m is calculated by the following formulas (3) and (4). X (Im1) denotes a position of the first virtual vehicle Im1 in the traveling direction. V (Im1) denotes the speed of the first virtual vehicle Im1.

$$THW=(X(Im1)-X(m))/V(m) \quad (3)$$

$$VI=(X(Im1)-X(m))/(V(Im1)-V(m)) \quad (4)$$

In the graph, the position of the second virtual vehicle Im2 with respect to the other vehicle m is also calculated using the same concept as described above.

Here, the setter 142 sets the first virtual vehicle Im1 at a position where the first virtual vehicle Im1 can catch up with the other vehicle m in a first set time. The first set time is, for example, a time that does not make an occupant of the first virtual vehicle Im1 feel uncomfortable when it is assumed that the occupant is in the first virtual vehicle Im1, or a time that does not make an occupant of the other vehicle m feel uncomfortable when it is assumed that the first virtual vehicle Im1 exists. The first set time is, for example, a time such as 2 seconds or 3 seconds. For example, as shown in FIG. 8, positions where coordinates of the first virtual vehicle Im1 are plotted on the vertical axis of the graph are coordinates corresponding to positions where the first virtual vehicle Im1 catches up with the other vehicle m in a first set time ST1.

The setter 142 sets the second virtual vehicle Im2 at a position where the second virtual vehicle Im2 can catch up with the other vehicle m in a second set time. The second set time is, for example, a time twice the first set time. For example, when the first virtual vehicle Im1 is set at a position where the first virtual vehicle Im1 can catch up with the other vehicle m in 2 seconds, the second virtual vehicle Im2 is set at a position where the second virtual vehicle Im2 can catch up with the other vehicle m in 4 seconds. For example, as shown in FIG. 8, positions where coordinates of the second virtual vehicle Im2 are plotted on the vertical axis of the graph are coordinates corresponding to positions where the second virtual vehicle Im2 catches up with the other vehicle m in a second set time ST2.

Figure 9:
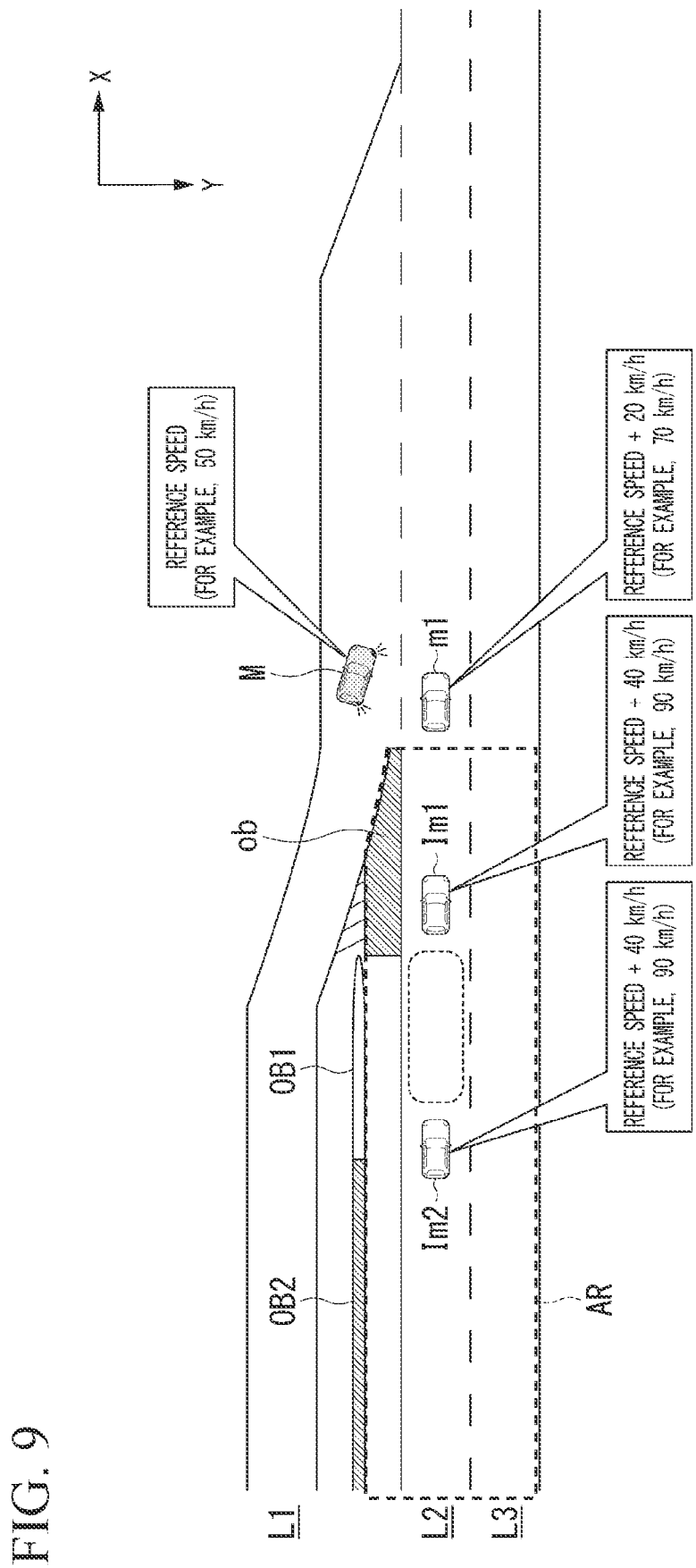
FIG. 9 is a diagram showing an example of the speeds of a vehicle, another vehicle, a first virtual vehicle, and a second virtual vehicle.

FIG. 9 is a diagram showing an example of the speeds of the vehicle M, the other vehicle m1, the first virtual vehicle Im1, and the second virtual vehicle Im2 For example, it is assumed that the vehicle M is travelling at a reference speed and the other vehicle m1 is travelling at the reference speed+20 km/h. In such a case, the vehicle M sets a condition that the merging of the vehicle M is strict. The condition that the merging of the vehicle M is strict is a condition that there is another vehicle (virtual vehicle) having a speed (for example, the reference speed+40 km/h) faster than that of the other vehicle m1 behind the other vehicle m1. In this way, the vehicle M can set a speed at which the vehicle M can smoothly change lanes.

Even though there are no other vehicles behind the other vehicle m1, since the vehicle M performs a lane change under looser conditions than the strict conditions, the vehicle M can smoothly perform a lane change.

For example, in a case where a lane change based on the other vehicle m1 is attempted without setting virtual vehicles behind the other vehicle m1, when it is recognized that there are other vehicles in a row behind the other vehicle m1, if the speeds of the other vehicles are faster than that of the other vehicle m1 by a predetermined speed or more, the vehicle M needs to suddenly accelerate or decelerate to change lanes.

Figure 10:
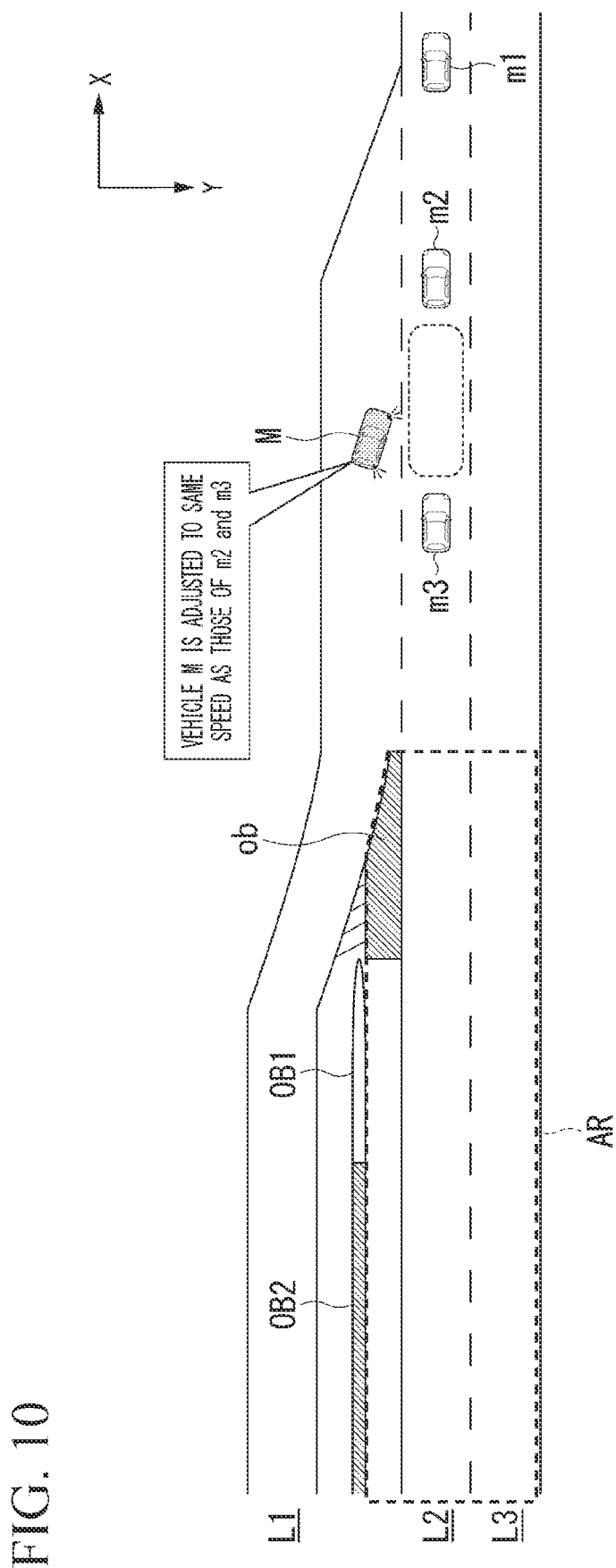
FIG. 10 is a diagram showing an example of a situation in which a vehicle changes lanes.

On the other hand, in the present embodiment, the vehicle M sets virtual vehicles and generates an action plan in consideration of the virtual vehicles. Therefore, as shown in FIG. 10, when another vehicle m2 and another vehicle m3 (a vehicle behind the other vehicle m2) which have not been recognizable so far are recognized, since the vehicle M is travelling at a speed close to the speeds of the other vehicle m2 and the other vehicle m3, the vehicle M can smoothly perform a lane change.

In the aforementioned example, it has been described that the speed of the other vehicle m1 is slower than that of the virtual vehicle; however, in the aforementioned example, even when the speed of the other vehicle m1 is faster than that of the virtual vehicle, the same process as above may be performed. In such a case, the first virtual vehicle Im1 and the second virtual vehicle Im2 are set to be separated without catching up with the other vehicle m1. In the graph of FIG. 8 described above, the coordinates of the speed index of the first virtual vehicle Im1 and the coordinates of the speed index of the second virtual vehicle Im2 are plotted at positions inverted from the minus side to the plus side. In this way, even when the speed of the other vehicle m1 is faster than that of the virtual vehicle, the vehicle M can perform a smooth lane change by controlling its own speed on the basis of the virtual vehicle.

[Relationship Between Virtual Vehicle and Another Actual Vehicle]

The action plan generator 140 generates an action plan on the basis of the presence or absence of a vehicle behind the other vehicle m1 when performing a lane change.

(A) When there is no other actual vehicle in front of the second virtual vehicle Im2, the action plan generator 140 causes the vehicle M to change lanes between the first virtual vehicle Im1 and the second virtual vehicle Im2.

(B) When there is another actual vehicle m2 within a predetermined distance behind the other vehicle m1, the action plan generator 140 replaces the other vehicle m2 with the first virtual vehicle Im1. When there is another actual vehicle m3 within a predetermined distance behind the other vehicle m2, the action plan generator 140 replaces the other vehicle m3 with the second virtual vehicle Im2.

(C) When the speed of the other vehicle m2 is larger than a set speed set in the first virtual vehicle Im1, the action plan generator 140 regards the other vehicle m2 as a new other vehicle m1. Then, the action plan generator 140 causes the vehicle M to change lanes on the basis of the first virtual vehicle Im1 and the second virtual vehicle Im2 set behind the new other vehicle m1, or another actual vehicle.

(D) When the position of the other vehicle m2 is ahead of the position of the first virtual vehicle Im1, the action plan generator 140 regards the other vehicle m2 as a new other vehicle m1. Then, the action plan generator 140 causes the vehicle M to change lanes on the basis of the first virtual vehicle Im1 and the second virtual vehicle Im2 set behind the new other vehicle m1, or another actual vehicle.

Figure 11:
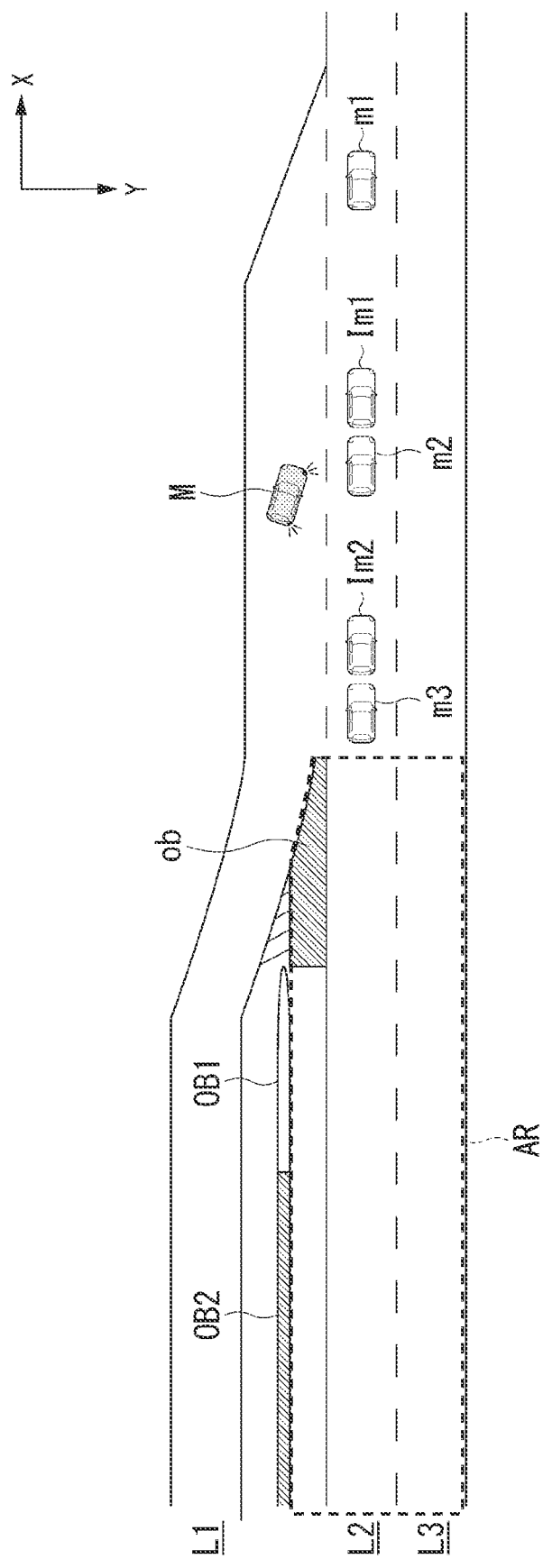
FIG. 11 is a diagram showing an example of a situation in which another actual vehicle is recognized.

FIG. 11 is a diagram showing an example of a situation in which another actual vehicle is recognized. FIG. 11 is an example of the situation of the above (B). For example, when the other vehicle m2 and the other vehicle m3 (two vehicles) are recognized behind the other vehicle m1, the action plan generator 140 regards the front other vehicle m2 as a vehicle corresponding to the first virtual vehicle Im1 and regards the rear other vehicle m3 as a vehicle corresponding to the second virtual vehicle Im2 The action plan generator 140 generates an action plan on the basis of the speed and position of the other vehicle m2 and the speed and position of the other vehicle m3 in order to change lanes between the other vehicle m2 and the other vehicle m3. When the two actual other vehicles are recognized in this way, the action plan generator 140 performs control based on the two other vehicles.

The action plan generator 140 may generate an action plan as follows.

Figure 12:
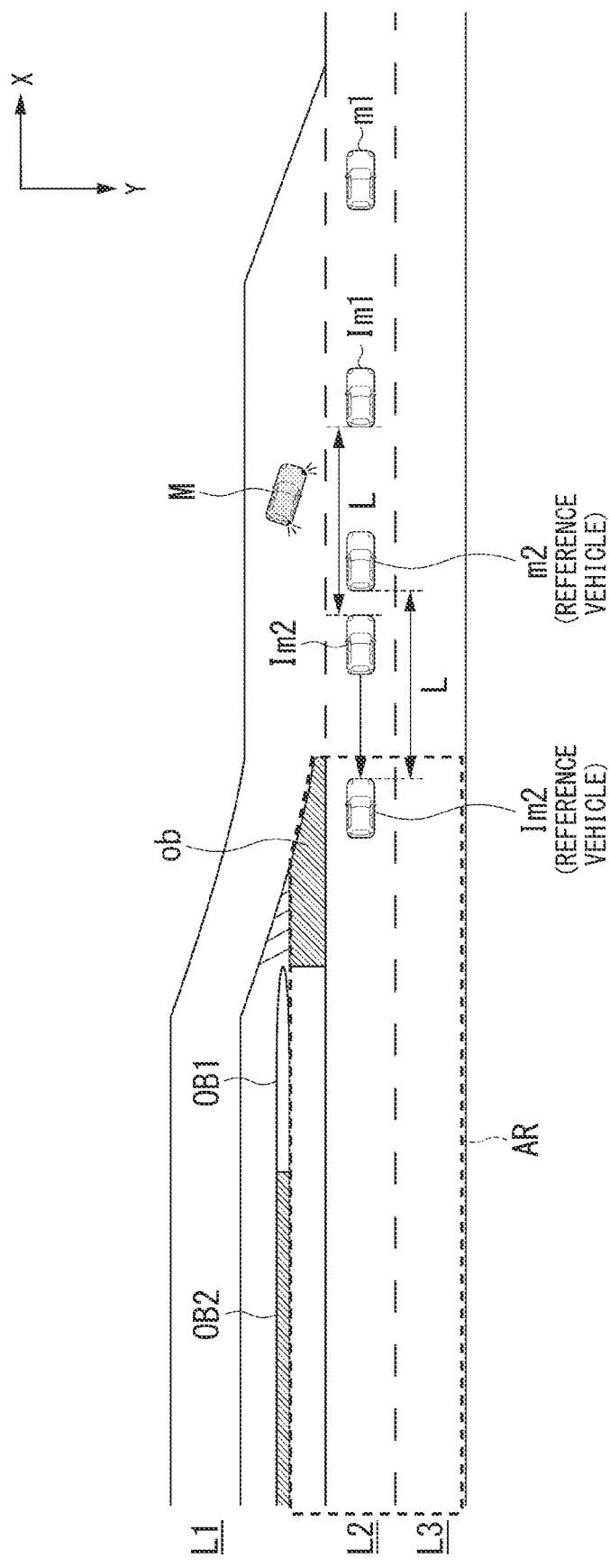
FIG. 12 is a diagram (part 1) explaining the setting of virtual vehicles when another vehicle is recognized.

(1) When the other vehicle m2 is recognized behind the other vehicle m1, the action plan generator 140 cancels the setting of the first virtual vehicle Im1, and causes the vehicle M to change lanes on the basis of the other vehicle m2, and the second virtual vehicle Im2 newly set behind the other vehicle m2 or another vehicle behind the other vehicle m2. For example, when one other vehicle m2 is recognized and exists in front of the second virtual vehicle Im2 (or when the other vehicle m2 exists in front of the second virtual vehicle Im2 by a predetermined distance), the action plan generator 140 regards the other vehicle m2 as a vehicle (reference vehicle) corresponding to the first virtual vehicle Im1. Moreover, as shown in FIG. 12, the action plan generator 140 shifts the position of the second virtual vehicle Im2 to the rear of the other vehicle m2. For example, the second virtual vehicle Im2 (reference vehicle) is set at a position at a distance L from the other vehicle m2. The distance L is an initially set distance L between the first virtual vehicle Im1 and the second virtual vehicle Im2.

Figure 13:
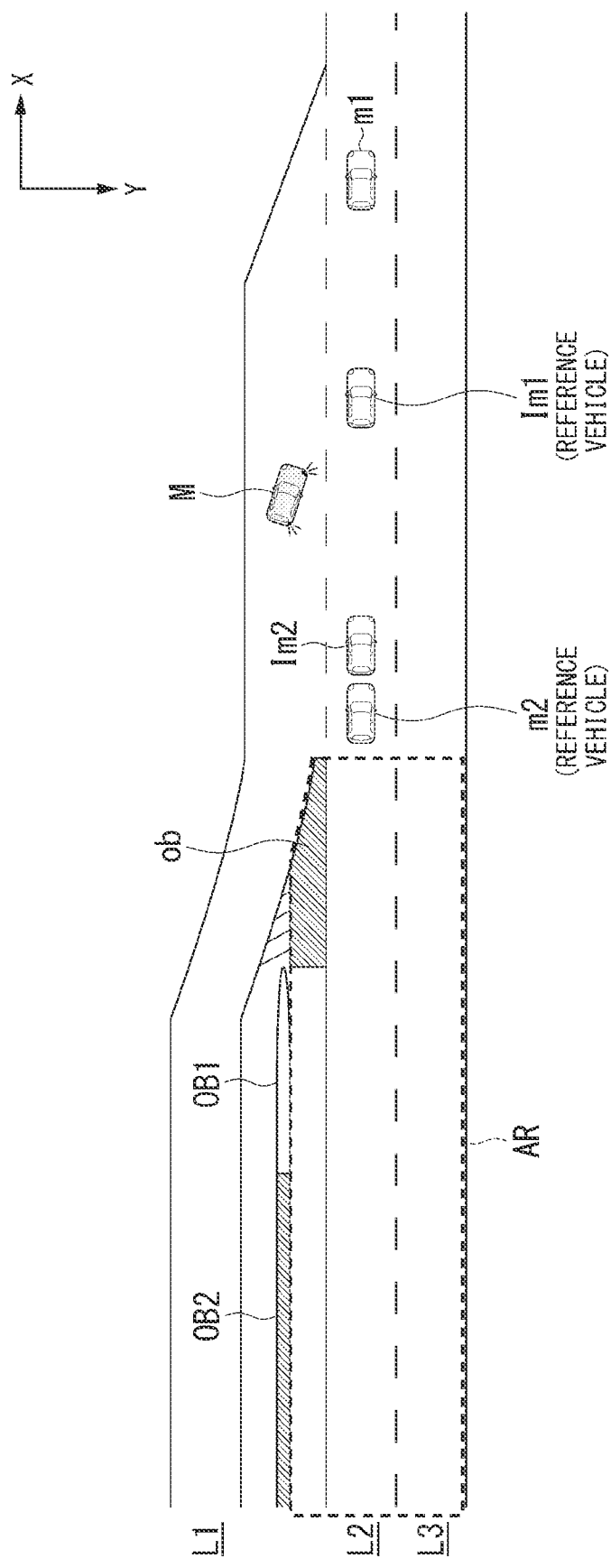
FIG. 13 is a diagram (part 2) explaining the setting of virtual vehicles when another vehicle is recognized.

(2) When one other vehicle is recognized and exists behind the second virtual vehicle Im2, the action plan generator 140 regards the other vehicle as a vehicle corresponding to the second virtual vehicle Im2 (see FIG. 13). In such a case, the setting of the first virtual vehicle Im1 is maintained. That is, the action plan generator 140 recognizes the other vehicle m2 behind the other vehicle m1, and when the recognized other vehicle m2 is located behind the second virtual vehicle Im2, the action plan generator 140 causes the vehicle M to change lanes on the basis of the first virtual vehicle Im1 (reference vehicle) and the other vehicle m2 (reference vehicle).

As described above, the automated driving control device 100 appropriately sets virtual vehicles according to the recognition situation of other vehicles. As a consequence, it is possible to cause a vehicle to change lanes.

[Flowchart]

Figure 14:
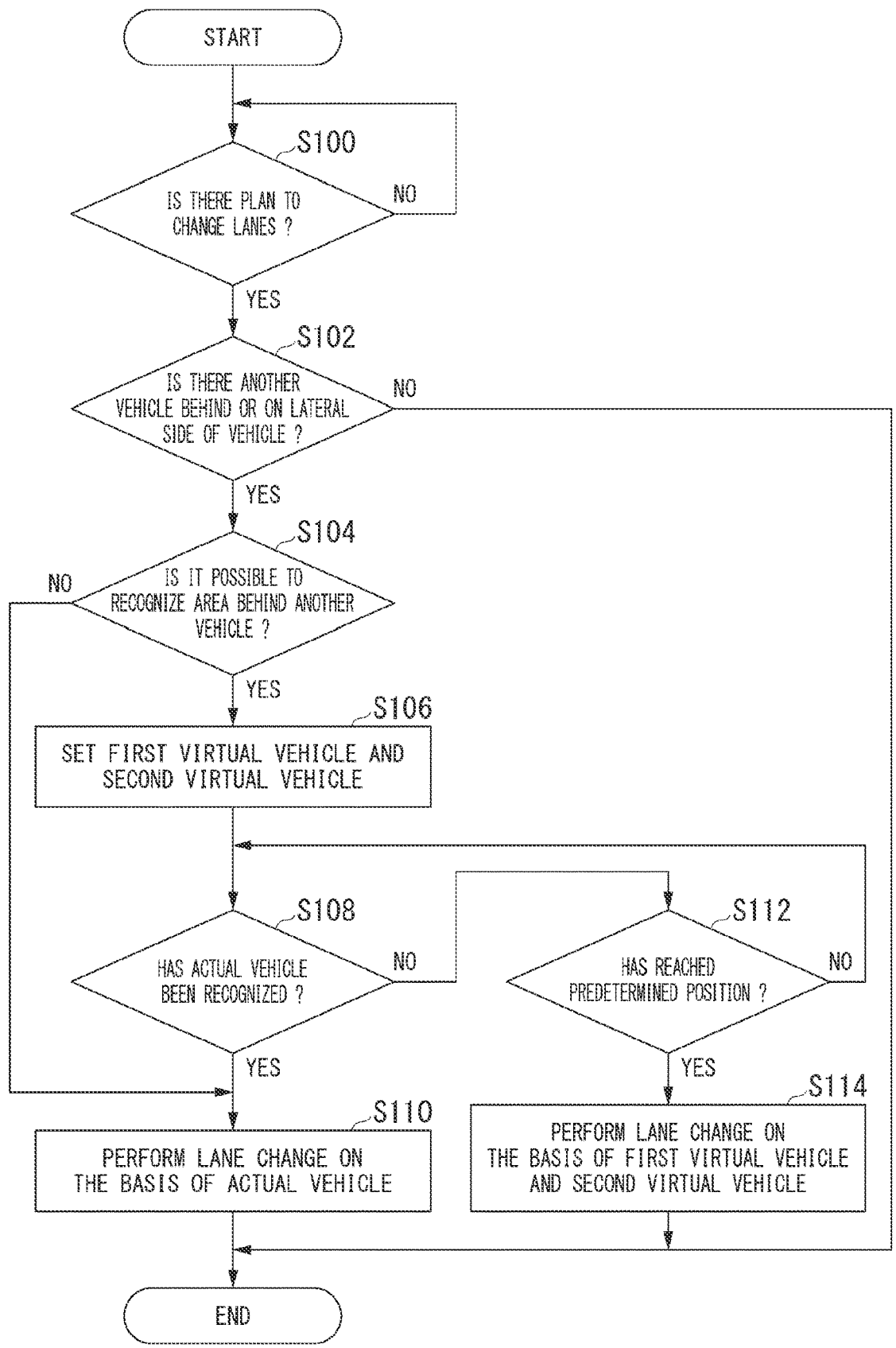
FIG. 14 is a flowchart showing an example of the flow of a process performed by an automated driving control device.

FIG. 14 is a flowchart showing an example of the flow of a process performed by the automated driving control device 100. First, the action plan generator 140 determines whether there is a plan to change lanes (step S100). When there is a plan to change lanes, the action plan generator 140 determines whether there is another vehicle behind or on the lateral side of the vehicle M in the second lane L2 (step S102). When there is no other vehicle, the automated driving control device 100 ends the process of the present flowchart. In such a case, the automated driving control device 100 changes lanes to the second lane L2 at a predetermined timing.

When there is another vehicle, the action plan generator 140 determines whether the recognizer 130 has recognized an area behind the other vehicle (step S104). When the recognizer 130 has not recognized the area behind the other vehicle, the automated driving control device 100 proceeds to the process of step S110. When the recognizer 130 has recognized the area behind the other vehicle, the setter 142 sets the first virtual vehicle and the second virtual vehicle (step S106).

Next, the action plan generator 140 determines whether the recognizer 130 has recognized another actual vehicle (vehicle behind the other vehicle recognized in step S104) (step S108). When another actual vehicle has been recognized, the action plan generator 140 causes the vehicle M to change lanes on the basis of the speed and position of the actual other vehicle (step S110).

When the other actual vehicle has not been recognized, the action plan generator 140 determines whether the vehicle M has reached a predetermined position in the first lane L1 (step S112). When the vehicle M has not reached the predetermined position in the first lane L1, the automated driving control device 100 returns to the process of step S108. When the vehicle M has reached the predetermined position in the first lane L1, the action plan generator 140 causes the vehicle M to change lanes on the basis of the speed and position of the first virtual vehicle and the speed and position of the second virtual vehicle set in step S106 (step S114). In this way, the automated driving control device 100 ends the process of one routine of the present flowchart.

By the aforementioned process, the automated driving control device 100 can control the vehicle M to a position where the vehicle M easily change lanes, and cause the vehicle M to smoothly change lanes.

In accordance with the embodiment described above, when the other vehicle m1 is recognized and the other vehicle m2 existing behind the other vehicle m1 is not recognized, the automated driving control device 100 can set the first virtual vehicle Im1 behind the other vehicle m1 and the second virtual vehicle Im2 behind the first virtual vehicle Im1, and cause the vehicle M to change lanes to the second lane L2 on the basis of the position of the other vehicle m1, the position of the first virtual vehicle Im1, and the position of the second virtual vehicle Im2, thereby causing the vehicle M to smoothly change lanes.

[Hardware Configuration]

Figure 15:
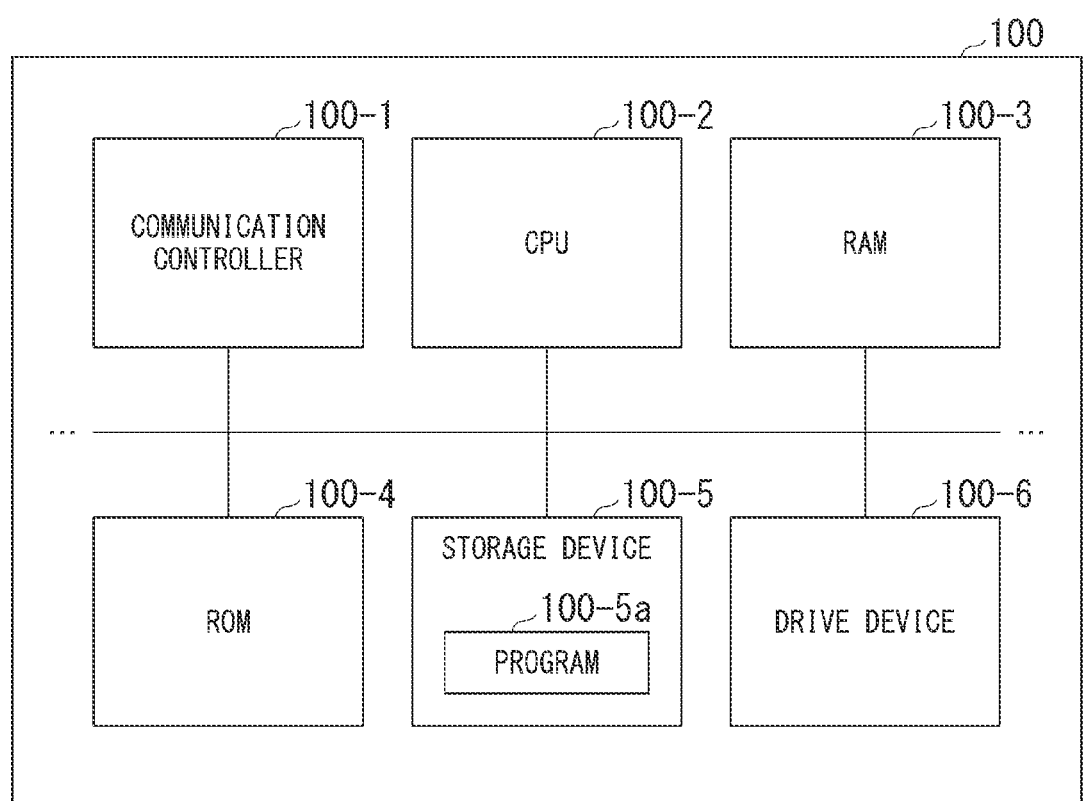
FIG. 15 is a diagram showing an example of a hardware configuration of the automated driving control device of an embodiment.

FIG. 15 is a diagram showing an example of a hardware configuration of the automated driving control device 100 of an embodiment. As shown in FIG. 15, the automated driving control device 100 has a configuration in which a communication controller 100-1, a CPU 100-2, a random-access memory (RAM) 100-3 used as a working memory, a read-only memory (ROM) 100-4 for storing a boot program and the like, a storage device 100-5 such as a flash memory and a hard disk drive (HDD), a drive device 100-6, and the like are connected to one another by an internal bus or a dedicated communication line. The communication controller 100-1 communicates with components other than the automated driving control device 100. The storage device 100-5 stores a program 100-5a that is executed by the CPU 100-2. The program is loaded on the RAM 100-3 by a direct memory access (DMA) controller (not shown) and the like, and is executed by the CPU 100-2. In this way, some or all of the first controller 120, the second controller 160, and functional units included therein are implemented.

The aforementioned embodiment can be represented as follows.

A vehicle control device includes a storage device that stores a program and a hardware processor, and the hardware processor executes the program stored in the storage device, thereby allowing the vehicle control device to perform a process of recognizing other vehicles near a vehicle, a process of, when a plan is made to change a lane of the vehicle from a first lane to a second lane, causing the vehicle to change the lane to the second lane on the basis of a position of a vehicle that travels in the recognized second lane, and a process of, when a first other vehicle which travels in the second lane and is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane on the basis of a position of the first other vehicle, a position of the first virtual vehicle, and a position of the second virtual vehicle.

Although a mode for carrying out the present invention has been described using the embodiments, the present invention is not limited to these embodiments and various modifications and substitutions can be made without departing from the spirit of the present invention.

What is claimed is:

1. A vehicle control device, comprising:
   a processor; and
   a memory that stores executable instructions that, when executed by the processor, facilitate performance of operations, comprising:
   recognizing other vehicles near a vehicle;
   when a plan is made to change a lane of the vehicle from a first lane to a second lane, causing the vehicle to change the lane to the second lane based on a position of a first other vehicle that travels in the second lane,
   wherein, when the first other vehicle is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane based on a position of the first other vehicle, a position of the first virtual vehicle, and a position of the second virtual vehicle; and
   setting the second virtual vehicle at a position obtained based on the position of the first other vehicle, a speed of the first other vehicle, and a preset speed of the second virtual vehicle.

2. The vehicle control device according to claim 1, wherein the operations further comprise:
   setting the first virtual vehicle at a position obtained based on the position of the first other vehicle, the speed of the first other vehicle, and the preset speed of the first virtual vehicle.

3. The vehicle control device according to claim 1, wherein the operations further comprise:
   determining the speed of the first virtual vehicle and the speed of the second virtual vehicle based on information indicating a speed of the first other vehicle travelling in the second lane.

4. A vehicle control device, comprising:
   a processor; and
   a memory that stores executable instructions that, when executed by the processor, facilitate performance of operations, comprising:
   recognizing other vehicles near a vehicle;
   when a plan is made to change a lane of the vehicle from a first lane to a second lane, causing the vehicle to change the lane to the second lane based on a position of a first other vehicle that travels in the second lane,
   wherein, when the first other vehicle is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane based on a position of the first other vehicle, a position of the first virtual vehicle, and a position of the second virtual vehicle,
   wherein the first lane merges into the second lane, and
   an obstacle which hinders visual recognition, from the first lane, of a situation of the second lane behind a merging point where the first lane merges into the second lane is provided in the vicinity of a start point of the merging point; and
   when a plan is made to merge the lane of the vehicle from the first lane to the second lane, causing the vehicle to change the lane to the second lane.

5. The vehicle control device according to claim 1, wherein the operations further comprise:
   when the vehicle is travelling in the first lane and the second other vehicle is recognized behind the first other vehicle in the second lane, canceling the setting of the first virtual vehicle, and causing the vehicle to change the lane based on the second other vehicle, and a third other vehicle newly set behind the second other vehicle or a third other vehicle behind the second other vehicle.

6. The vehicle control device according to claim 1, wherein the operations further comprise:
   when the second other vehicle is recognized behind the first other vehicle in the second lane and a speed of the recognized second other vehicle is faster than the preset speed of the second virtual vehicle, regarding the second other vehicle as the first other vehicle.

7. A vehicle control device, comprising:
   a processor; and
   a memory that stores executable instructions that, when executed by the processor, facilitate performance of operations, comprising:
   recognizing other vehicles near a vehicle;
   when a plan is made to change a lane of the vehicle from a first lane to a second lane, causing the vehicle to change the lane to the second lane based on a position of a first other vehicle that travels in the second lane,
   wherein, when the first other vehicle is a predetermined distance from the vehicle in a traveling direction is recognized and a second other vehicle behind the vehicle in the second lane is not recognized, setting a first virtual vehicle behind the first other vehicle and a second virtual vehicle behind the first virtual vehicle, and causing the vehicle to change the lane to the second lane based on a position of the first other vehicle, a position of the first virtual vehicle, and a position of the second virtual vehicle,
   wherein, when the second other vehicle is recognized behind the first other vehicle in the second lane and the recognized second other vehicle is located behind the second virtual vehicle, causing the vehicle to change the lane based on the first virtual vehicle and the second other vehicle.

* * * * *